United States Patent [19]

Rao et al.

[11] Patent Number: 5,460,900
[45] Date of Patent: Oct. 24, 1995

[54] LEAD-ACID BATTERY HAVING A FLUID COMPARTMENT FOR REDUCING CONVECTION-INDUCED HEAT TRANSFER

[75] Inventors: Purushothama Rao, Eagan; Thomas F. Uhlemann, Edina; William H. Kump, West St. Paul, all of Minn.

[73] Assignee: GNB Battery Technologies Inc., Mendota Heights, Minn.

[21] Appl. No.: 287,191

[22] Filed: Aug. 8, 1994

[51] Int. Cl.⁶ .................................................. H01M 10/50
[52] U.S. Cl. .................. 429/72; 429/120; 429/148; 429/176
[58] Field of Search ..................................... 429/120, 148, 429/176, 71, 72, 163

[56] References Cited

U.S. PATENT DOCUMENTS 4,107,402  8/1978  Dougherty et al. ............... 429/120

5,212,025  5/1993  Shibata et al. ..................... 429/120

FOREIGN PATENT DOCUMENTS 481891  3/1938  United Kingdom .................. 429/120

*Primary Examiner*—John S. Maples
*Attorney, Agent, or Firm*—Leydig, Voit & Mayer, Ltd.

[57] ABSTRACT

A lead-acid storage battery for starting, lighting and ignition applications is disclosed which minimizes convection-induced, heat transfer from the vehicle underhood environment surrounding the battery to the battery itself and comprises an injection-molded, integral plastic container having a multi-wall configuration in which an inner container includes the cell elements of the battery and at least one outer container spaced from the inner container provides at least one fluid compartment for allowing fluid flow through the fluid compartment to achieve the desired thermal regulation, the fluid flow path being created by a series of spaced fluid baffles.

15 Claims, 9 Drawing Sheets

LEAD-ACID BATTERY HAVING A FLUID COMPARTMENT FOR REDUCING CONVECTION-INDUCED HEAT TRANSFER

FIELD OF THE INVENTION

This invention relates to lead-acid batteries and, more particularly, to lead-acid batteries allowing the use of external passive or active thermal heating or cooling by using a liquid, gas or vacuum means to maintain and operate the batteries at a designated temperature range regardless of the exposed ambient conditions.

DESCRIPTION OF THE PRIOR ART

Current vehicles, particularly automobiles, emphasize aerodynamic styling and are equipped with a variety of driver comfort features and safety devices. These features have resulted in such vehicles operating in many situations with very high underhood engine temperatures. During stop-and-go driving, or while the engine of the vehicle is idling, there is typically very little air or wind movement, causing the underhood air temperatures to often exceed 200° F. in some parts of the United States.

Extended exposure of the lead-acid battery used for the starting, lighting and ignition in such vehicles (often termed "SLI" batteries) leads to the loss of water from the electrolyte due to excessive gassing and attendant water loss in vehicle charging and evaporation as well as to rather rapid degradation of the battery components. In particular, the positive grids used in such SLI batteries tend to exhibit substantially accelerated corrosion at such high temperatures. Ultimately, the acceleration of positive grid and strap corrosion and other material degradation results in premature battery failure and a no-start condition for the vehicle.

Even further, since the SLI batteries are usually located in the front of the underhood compartment where there is little air movement around, the problem is exacerbated by the engine fan blowing hot air onto the battery in certain vehicles. The battery operating temperature thus increases primarily due to the convective heat surrounding such batteries and is usually not a result of any heat effects arising from the charge and discharge processes of the battery itself.

Substantial material innovations have been made which have significantly improved the situation. However, there is a desire to even further overcome the detrimental effects of higher underhood temperature and to deal with the conditions that cause premature battery failure.

Thus, considerable effort has been expended in an attempt to deal with these high underhood temperatures and conditions. Some vehicles are indeed even equipped with heat shields for the batteries by the vehicle manufacturer. Further, various types of heat shields have been devised for the SLI lead-acid batteries themselves. One type of heat shield uses insulating materials, such as fiberglass and polystyrene and polyurethane foams, which are wrapped, or otherwise disposed, around the periphery of the battery container. For example, U.S. Pat. No. 2,707,721 to Anderson et al. discloses a jacket fabricated from a composite material incorporating fiberglass. Another approach effectively creates a double-walled battery container having a sealed insulating air space between the walls, such as is disclosed in U.S. Pat. No. 5,212,025 to Shibata et al. Shibata et al. thus show a heat-shielding case which has projections provided on the lower inner sides. When the battery container is placed into the heat-shielding case, projections engage with corresponding recesses provided on the sidewalls of the battery container to secure the battery container in position.

Further, U.S. Pat. No. 4,107,402 to Dougherty et al. discloses a battery and battery container having air-flow passages therethrough. The container includes partitions separating the cells of the battery, and each partition comprises a pair of spaced-apart, parallel partition walls which define narrow, generally planar, air-flow passages between the cells of the battery. These spaced-apart partition walls are integrally joined together at a location adjacent a central portion which includes an aperture to permit the intercell welding of the adjacent cells. It is further contemplated that the sidewalls of a battery can include vertically extending elongated slots which communicate with the air-flow passages. Similarly, the cover of the battery is further provided with a plurality of parallel spaced apart slots which communicate with the air-flow passages. As is discussed therein, the Dougherty et al. '402 patent concerns facilitating heat transfer from the battery itself.

The foregoing are only illustrative of the considerable prior effort that has been made in attempting to solve various thermal problems. Yet, despite all of this considerable prior effort, there still exists the need to provide a satisfactory solution to the underhood environment in which SLI lead-acid batteries operate in current automobiles. Even further, any proposed approach to solving the problem should allow manufacture and assembly by existing automotive battery manufacturing processes with minimum complications. Stated differently, the commercial efficacy of a proposed solution depends not only upon the effectiveness in solving the in-service problem, but must also take into account the costs attendant with the proposed solution. Any solution that requires significant modifications in the SLI battery manufacturing and assembly process can cause problems that can only be overcome, if at all, at substantial expense and with considerable difficulty.

Accordingly, a primary object of the present invention is to provide a lead-acid battery capable of reducing, or otherwise altering, the thermal effects of the high vehicle underhood ambient temperatures on the battery. A more specific object provides a battery capable of reducing convection-induced, heat transfer from the vehicle engine environment surrounding the battery to the battery itself.

Another object of this invention is to provide such a lead-acid battery that is amenable to commercial production on a high volume, mass production basis, as is required for automotive SLI lead-acid batteries and the like. A related and more specific object provides such a battery that can be manufactured using existing technology for making lead-acid batteries with only relatively minor modifications in existing processes being required.

These and other objects and advantages of the invention will be apparent to those skilled in the art upon reading the following description and upon reference to the drawings.

SUMMARY OF THE INVENTION

The subject invention provides a lead-acid battery capable of reducing the thermal effects of the high underhood ambient temperatures on such a battery by preventing, or at least significantly reducing, convection-induced, heat transfer from the higher vehicle engine ambient temperature environment to the battery itself. A principal aspect of the present invention utilizes a battery container designed to allow manufacturing by any desired fabricating technique, principally by injection molding, essentially the same as utilized in the manufacture of currently used containers for lead-acid batteries, particularly SLI batteries. The battery container employed in the present invention comprises a multi-wall container having at least one fluid compartment with an annular space defined by the space between an inner and outer, integrally formed container which can serve to hold a liquid, gas or vacuum for the purpose of maintaining a specific desired battery temperature. A series of fluid baffles provide a path for a fluid to be circulated around the end and side walls of the battery while also aiding in maintaining the requisite strength characteristics of the battery. The lead-acid battery of the present invention can be manufactured and assembled using the processes and equipment typically employed in assembling conventional SLI lead-acid batteries.

DETAILED DESCRIPTION OF THE INVENTION

Figure 1:
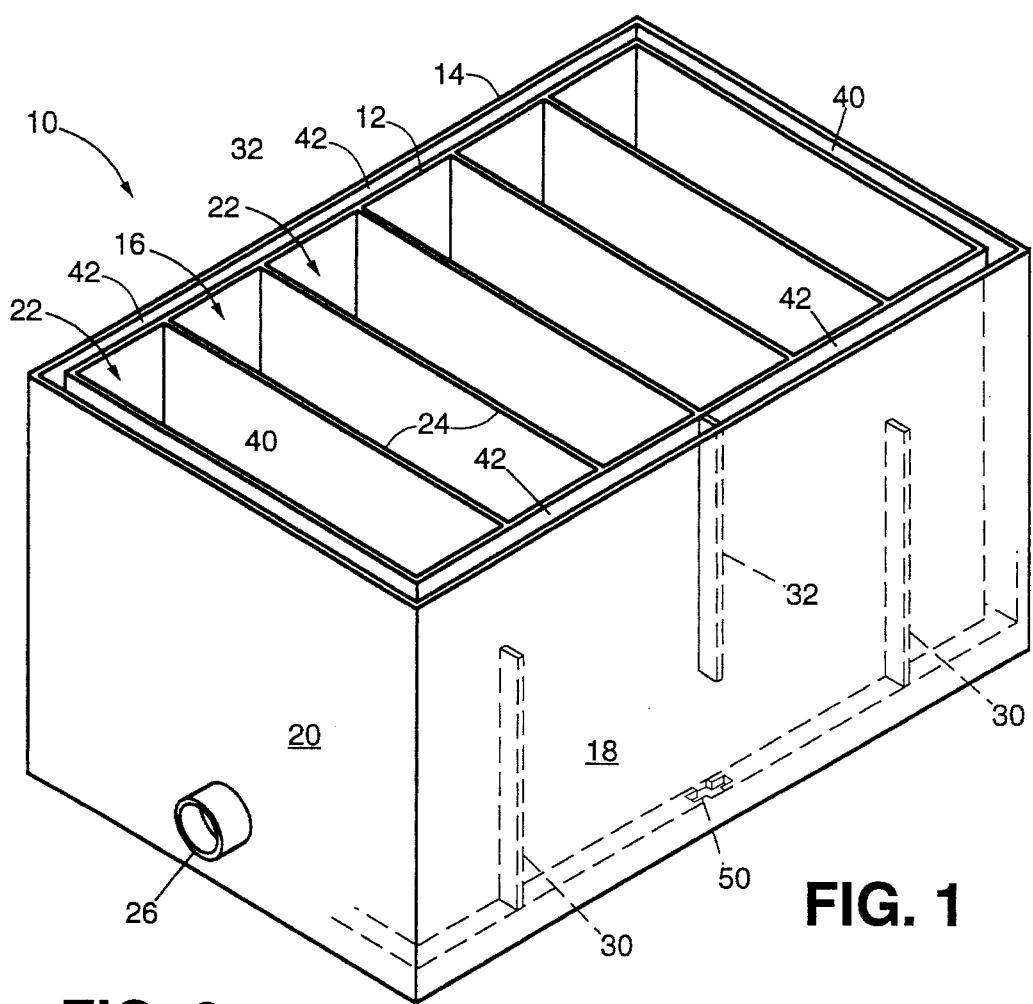
FIG. 1 is a perspective view of one embodiment of a container used in the battery of the present invention.

As illustrated in the embodiment shown in FIGS. 1–5, the battery container shown comprises an integrally molded, multi-walled container 10 having an inner container 12 and with intermediate walls and an outer container 14 and the multi-walls forming an annular space. As can best be seen in FIGS. 1–3, a fluid compartment, typically for maintaining battery temperature, shown generally at 16, surrounds the periphery of the inner container 12. Side walls 18 of the outer battery container 14 form the side walls of the battery while end walls 20 of outer container 14 comprise the end walls of the battery as manufactured.

The inner container 12 is divided into a series of cells shown generally at 22 by cell partitions 24. As illustrated, six cells are provided for a twelve volt battery, as is of course customary for automotive SLI batteries, for a six volt battery only three cells will be used and the like.

Figure 2:
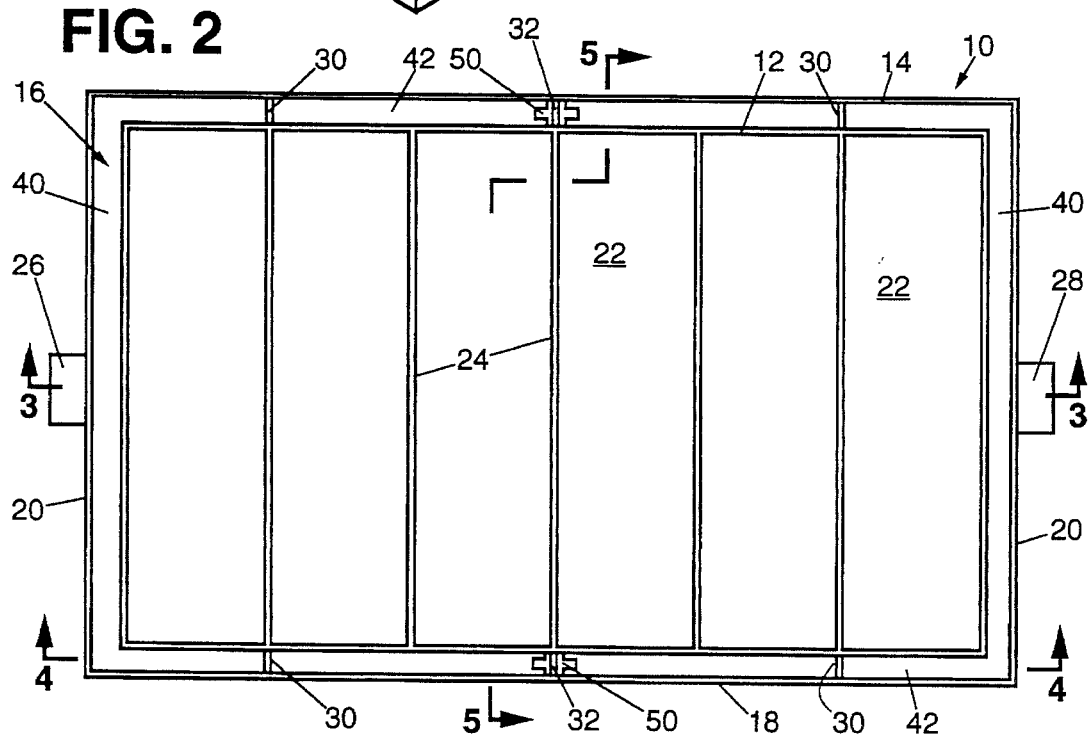
FIG. 2 is a top elevation view of the container shown in FIG. 1 and showing the positioning of the fluid ingress to, and egress from, the fluid compartment.
Figure 3:
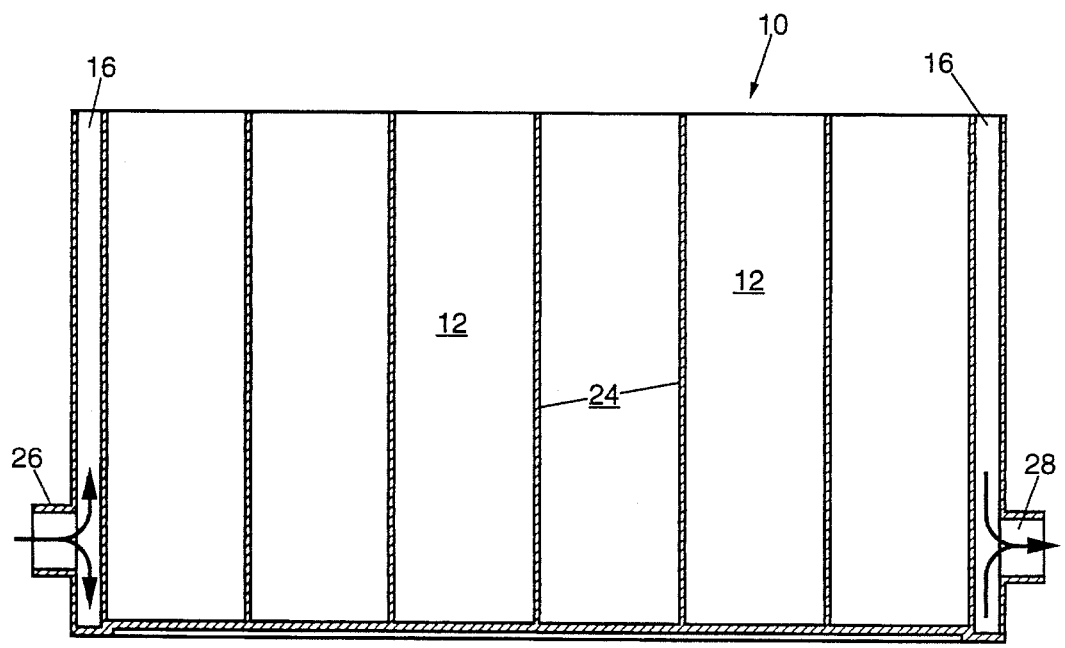
FIG. 3 is a cross-sectional view taken generally along line 3—3 of the container as shown in FIG. 2 and further showing the fluid compartment.
Figure 4:
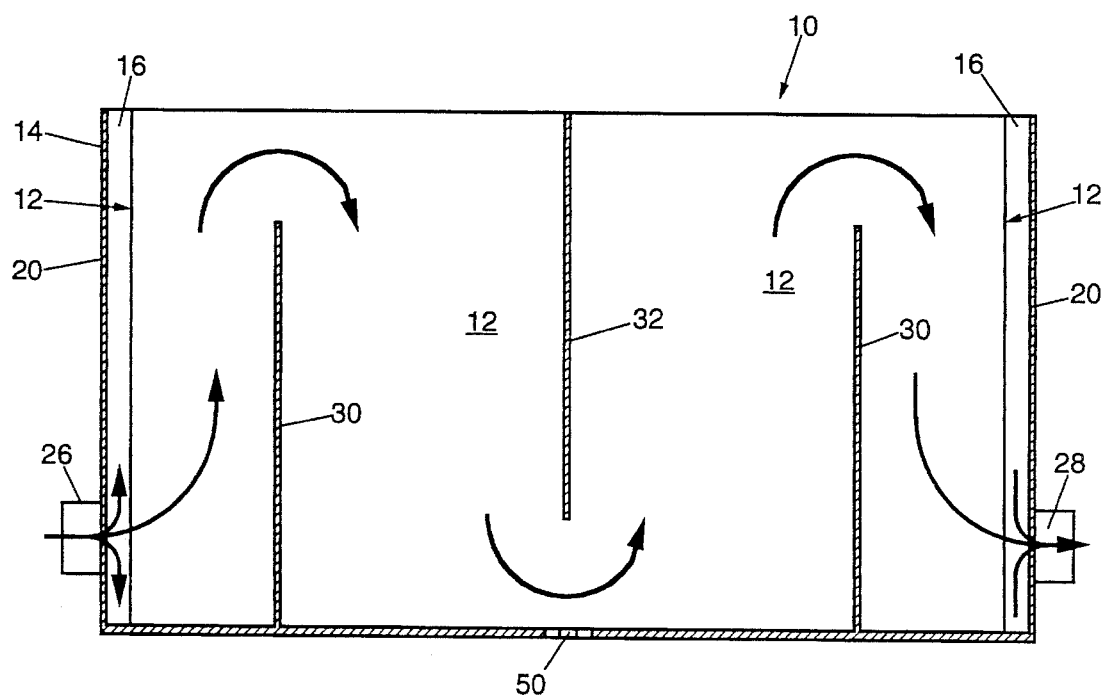
FIG. 4 is a cross-sectional view taken generally along line 4—4 of the container as shown in FIG. 2 and illustrating the relative positioning of the fluid baffles positioned in the fluid compartment.

Fluid ingress into fluid compartment 16 is provided through fluid inlet 26. Where fluid egress is desired, this can be achieved through fluid outlet 28, as shown in FIGS. 2–4.

Fluid inlet 26 and optional fluid outlet 28 may be positioned as desired consistent with the objective of achieving the desired fluid flow when continuous fluid flow is employed. Principally, the size of fluid inlet 26 will be determined by the requirements for the desired fluid flow, including the size of the fluid compartment 16. Further, the particular location of fluid inlet 26 and optional fluid outlet 28 will depend upon the types of holddowns required to maintain the battery in the vehicle. Positioning the fluid inlet 26 and optional fluid outlet 28 as shown in FIGS. 1–3 provides a configuration that not only can be readily molded by conventional injection molding techniques, but also should not interfere with conventional battery holddowns currently being employed.

As an example of an embodiment that should be satisfactory, the fluid inlet 26 and optional fluid outlet 28 are circular in shape with an inside diameter of about 0.75 inch. These inlets are positioned such that their centerline is about 0.225 inch from the bottom of the container 10. A fluid compartment 16 with about 0.325 inch width should also be satisfactory.

Pursuant to one aspect of the present invention, a series of fluid baffles are utilized to provide a desirable path for fluid flow around the periphery of the inner container 12 and through the fluid compartment 16. In addition to being positioned to achieve the desired fluid flow path, the fluid baffles employed should be configured and located so as to provide the container 10 with adequate strength characteristics to endure the conditions in transport and service. More particularly, the strength imparted should be adequate to insure that fluid compartment 16 and the desired fluid flow path are not unduly adversely affected. To this end, and as best seen in FIG. 4, two upstanding fluid baffles 30 are provided with a downwardly depending fluid baffle 32 being positioned therebetween.

Figure 5:
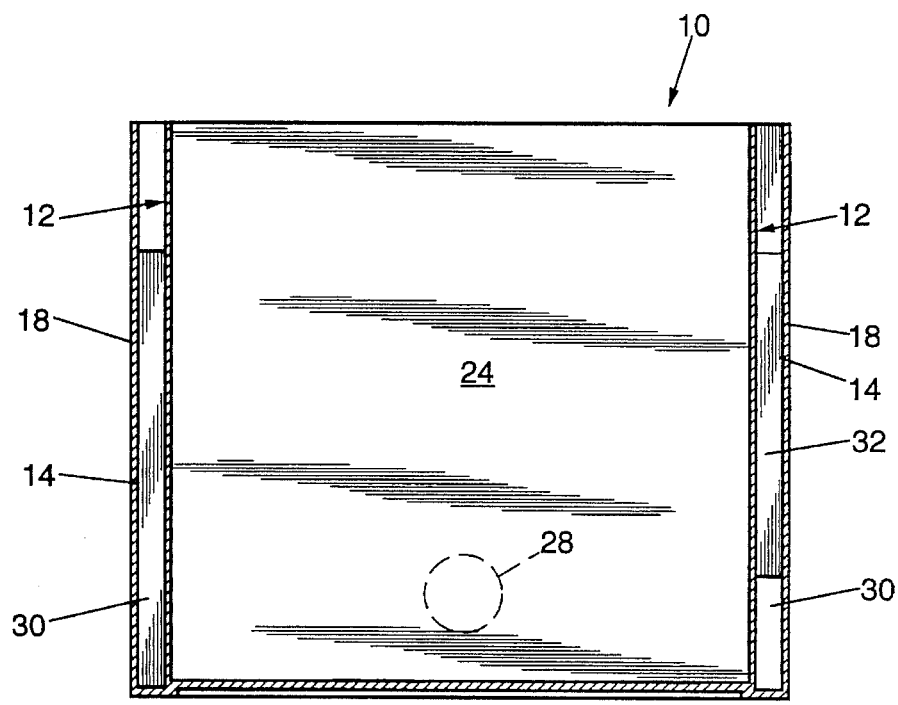
FIG. 5 is a cross-sectional view taken generally along line 5—5 of the container as shown in FIG. 2 and further illustrating the positioning of certain of the fluid baffles in the fluid compartment.

The size, location and number of the fluid baffles 30 and 32 can be varied as desired, consistent with achieving the fluid flow path and strength characteristics considered appropriate for the particular application. It should be satisfactory for most applications to use three fluid baffles positioned and configured as shown in FIG. 5. While not essential, enhanced strength characteristics should be achieved by aligning fluid baffles 30 and 32 with cell partitions 24. It will also be preferable to locate fluid inlet 26 such that incoming fluid into fluid compartment 16 will contact a fluid baffle to initiate a moving fluid flow path that will traverse the side walls 18 of container 10. As one illustrative example of dimensions considered suitable for an SLI lead-acid battery, the thickness of fluid baffles 30 and 32 can be about 0.70 inch (similar to the thickness of cell partitions 24) and can terminate about 1.5 inch from, respectively, the top and bottom of battery container 10. If desired, as may be appreciated, fluid baffles can be provided in end part 40 as well.

Any thermoplastic material may be utilized which possesses the desired characteristics for molding battery containers pursuant to this invention. As is well known, the currently used materials for SLI lead-acid batteries comprise an ethylene-propylene impact-modified copolymer in which polypropylene is a major constituent.

It should be appreciated that the material used for the container may, in whole or in part, be dictated by the particular mode of thermal regulation employed. The choice of the thermoplastic material utilized for molding containers will be based on the inherent gas and water vapor transport properties through the container walls. It will be necessary to use thermoplastic materials having the lowest gas vapor and water permeability or transmission rates through the thickness. Similarly, the type, number and configuration of fluid baffles employed may likewise be influenced by the specific thermal regulation mode utilized. Both of these aspects will be discussed hereinafter in conjunction with the discussion of the various thermal regulation modes themselves.

In accordance with another aspect of the present invention, a molding sequence and mold components are utilized which allow the battery container 10 to be made by injection molding techniques that are compatible with molds and techniques currently being utilized for the mass production of SLI lead-acid battery containers and covers. Thus, the present invention includes a molding sequence that achieves the reliable production of a container with the desired configuration for the fluid compartments employed that are stably dimensioned.

As is conventionally carried out, cells 22 and cell partitions 24 are made using mold core components sized to form the cells 22 that are spaced apart to define the desired thickness of the cell partitions 24. Typically, the mold core components can be free-standing because the metal mass of such components is more than adequate to avoid deflection of these components due to the plastic injection during molding.

Figure 6:
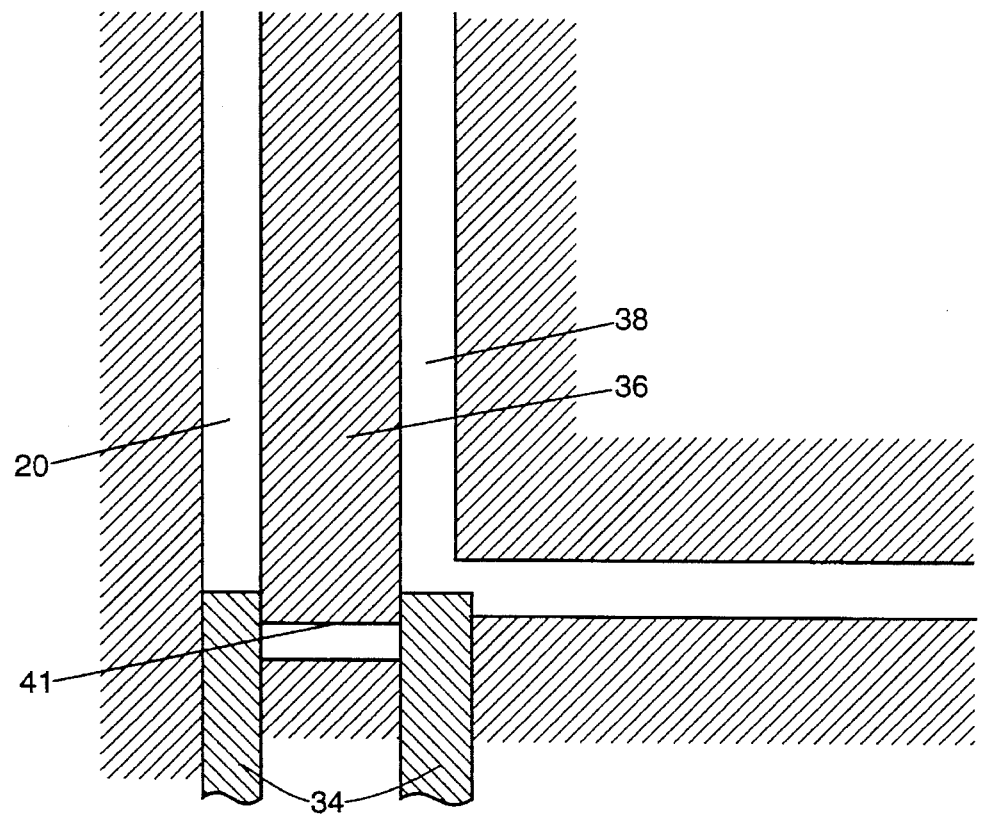
FIGS. 6 and 7 are partial schematic views, respectively showing core locks in a first position for holding the mold core pieces in place during molding of the container (FIG. 6) and the core locks withdrawn to a second position so as to allow completion of the molding of the container (FIG. 7)
Figure 7:
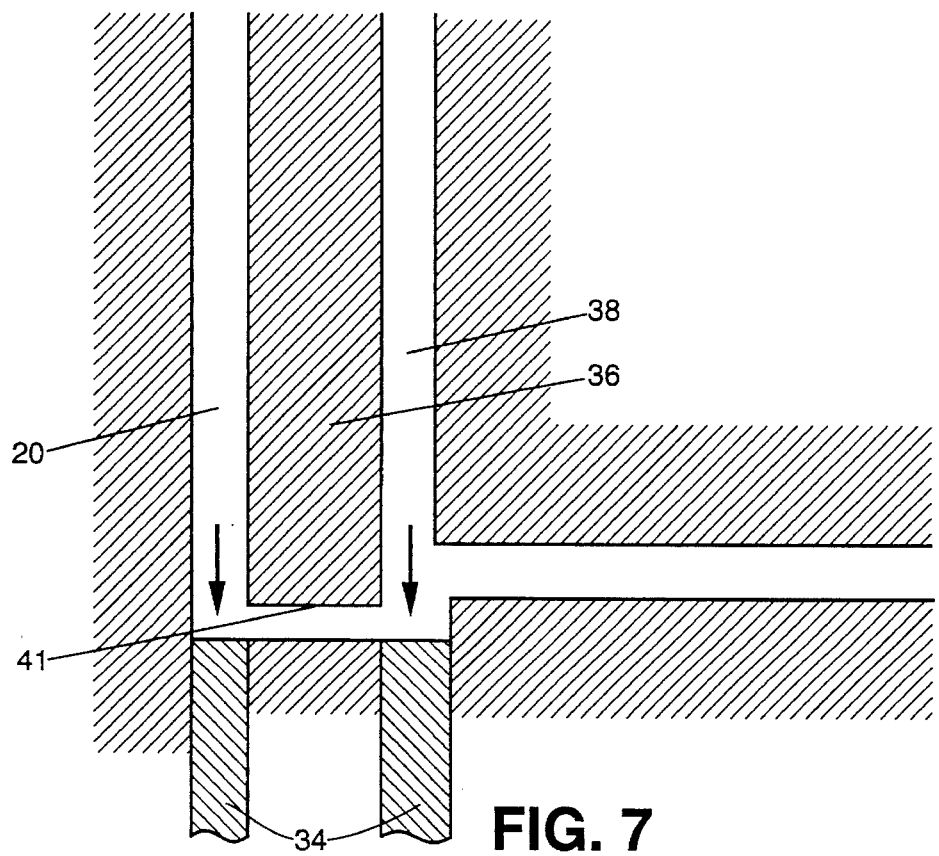

However, the fluid compartment 16 will generally be of a size where deflection of the core component will likely occur, should free-standing core components be used. Accordingly, and as is illustrated in FIGS. 6 and 7, core locks are utilized to minimize, if not essentially eliminate, deflection of the mold core components that define fluid compartment 16. In this fashion, production of a container having a stably dimensioned fluid flow compartment 16 can be achieved. Thus, by eliminating deflection of the core components which define the shape of the fluid compartment, the dimensions of the resulting, injection-molded plastic fluid compartment will be those dictated by the shape and configuration of the core components used. Deflection that could undesirably affect the functioning of the desired thermal regulation is avoided. To this end, and as is shown in FIG. 6, core locks 34 are in position to maintain a fluid compartment mold core 36 in the desired position between end wall 20 of battery container 10 and end wall 38 of inner container 12. The core locks 34 thus retain the bottom edge 41 of core 36 in position during the injection of plastic into the mold to form end walls 20 and 38 and the adjacent part of fluid compartment 16.

Completion of the bottom of the battery container 10 is then achieved by withdrawing core locks 34 as seen in FIG. 7. As is thus shown, core locks 34 are retracted so that the bottom areas, not filled with plastic when the core locks 34 were in place, now can be filled with plastic.

If desired, the core locks 34 can be essentially continuous for the width of the battery. However, it should likewise be suitable to utilize a series of separate core locks that hold the core 36 along its bottom edge at spaced, suitably located positions to prevent undue deflection during molding.

While illustrated for forming the end parts 40 of fluid compartment 16, it should be appreciated that this same technique should desirably be employed for forming the side portions 42 as well (FIGS. 1 and 2). The same considerations apply.

In addition, it is necessary to suitably configure the mold to make provision for any downwardly extending fluid baffles 32, as are utilized in the embodiment of FIGS. 1–5. In the illustrative embodiment shown in FIGS. 8 and 9, side wall mold cores 44 and 46 are keyed to accept core insert 48. In this fashion, the plastic being injected fills only the desired part of the height of the gap between these cores 44 and 46, thereby defining the length of the fluid baffles 32.

Figure 8:
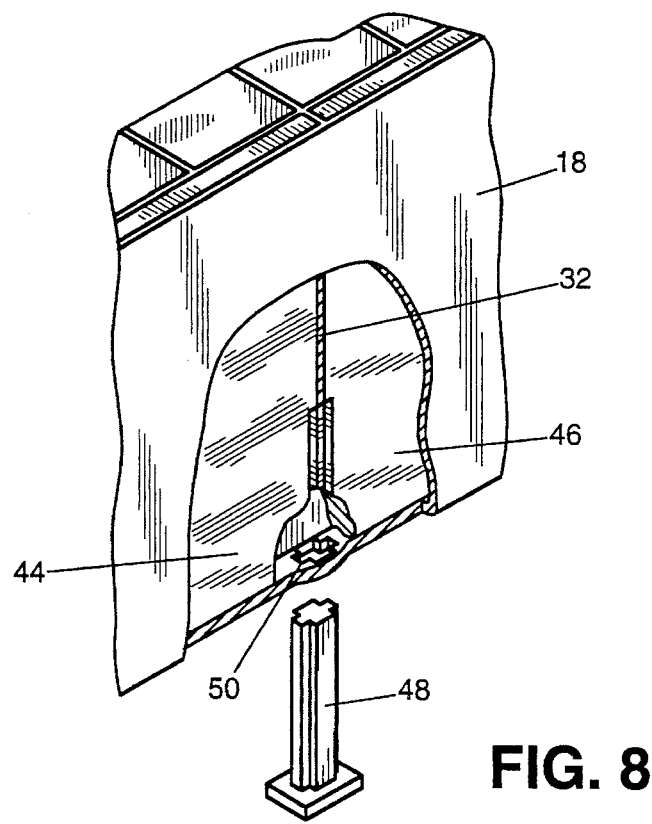
FIGS. 8 and 9 are partial fragmentary perspective views partially cut away to show the keyed core insert employed to form a downwardly extending fluid baffle exploded off (FIG. 8) and then in position (FIG. 9) as would occur in molding.
Figure 9:
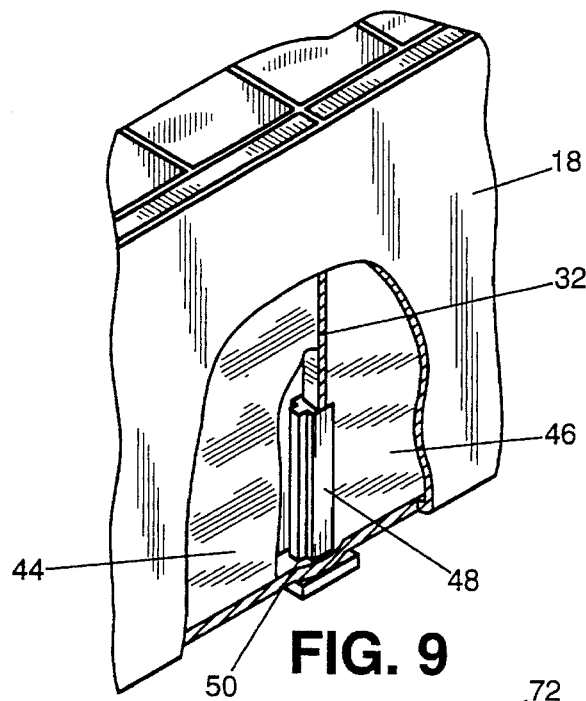

As may be appreciated, and as best seen in FIGS. 8 and 9, the bottom of the battery container 10 formed as shown will have apertures 50 resulting from use of core insert 48 and its withdrawal after completion of the molding operation. If desired, the battery may rest in service on a rubber or other mat to restrict fluid flow from fluid compartment 16 out through apertures 50. Alternatively, if considered desirable, plastic inserts may, of course, be configured and sealed in place in apertures 50 to provide a fluid-tight fluid compartment.

As has thus been seen, the modifications discussed herein may be incorporated into injection molding sequences commonly used in molding conventional containers for SLI lead-acid batteries. The present invention is thus readily amenable to mass production in a reliable fashion.

Thermal regulation of the battery in the automobile or other vehicle may be achieved by any desired means to provide the level of thermal regulation or modulation considered appropriate. In general, optimum temperatures for performance and service life will be achieved by maintaining the battery temperature within the range of 65° to 90° F. in the vehicle. As one example, such thermal regulation can be achieved by filling the fluid cooling compartment with stagnant air or a gas. The use of low thermal conductivity gasses such as argon, carbon dioxide and nitrogen are illustrative examples. Indeed, if suitable for the requirements of the particular application, it might be satisfactory to use a liquid fluid to fill the fluid compartment.

For some applications, it might be desirable to provide a continuous air flow through the annular fluid compartment or compartments used. This could be achieved by connecting the cooling and/or heating air of the automobile or other vehicle into the fluid inlet and/or fluid outlet in a designated annular space so that air at an appropriate temperature circulates through the fluid compartment to maintain the batteries at the desired temperature range of 65° to 90° F. in the vehicle. Similarly, gasses such as the low thermal conductivity gasses previously discussed could likewise be circulated through the fluid compartment.

Still further, the thermal regulation mode could employ a specific liquid fluid stream which would be circulated through the annular space to control the battery temperature. This could be achieved by using any desired cooling liquid. Many useful cooling liquids are known. Indeed, as is known, cooling liquids could be used that are converted into a gaseous form in the temperature range desired for operation of the battery. Particularly useful are specific lower thermal conductivity gaseous/liquid mediums such as, for example, halogenated hydrocarbons, particularly chlorofluoro hydrocarbons, and other organic liquids that remain liquid at temperatures less than 90° F. or so and become gaseous above this temperature.

Other thermal regulation modes would involve maintaining a vacuum in the fluid compartment annular space after assembly and formation of the battery. The vacuum level desired could be pulled using any known technique desired. For this mode, the fluid compartment in the container used, preferably, should be adequately configured to hold the desired vacuum. This will necessitate adequately sealing off apertures 50 as has been discussed herein.

As previously alluded to, the type of thermal regulation mode used may well affect, or dictate, the type and configuration of fluid baffles employed. Thus, where vacuum or a stagnant fluid is used, the principal function of the fluid baffles becomes maintaining the desired integrity of the fluid compartment. In such instances, the path of the fluid flow through the fluid compartment no longer is an issue. Accordingly, in such instances, there is no need to utilize downwardly extending fluid baffles and all upwardly extending baffles may be used, thereby simplifying somewhat the molding operation and other related aspects.

Similarly, where vapor transmission characteristics become significant, as, for example, when a vacuum thermal regulation mode is utilized, the material used for the container should possess adequate characteristics so that the desired vacuum will be retained in service. Engineering plastics having such characteristics are known and may be used.

While perhaps more desirable from the standpoint of simplicity, connecting the battery of the present invention to the cooling/heating system of the vehicle is just one alternative. It is, of course, also suitable to position in the vehicle a separate source for whatever fluid is desired, as may be appreciated.

Figure 10:
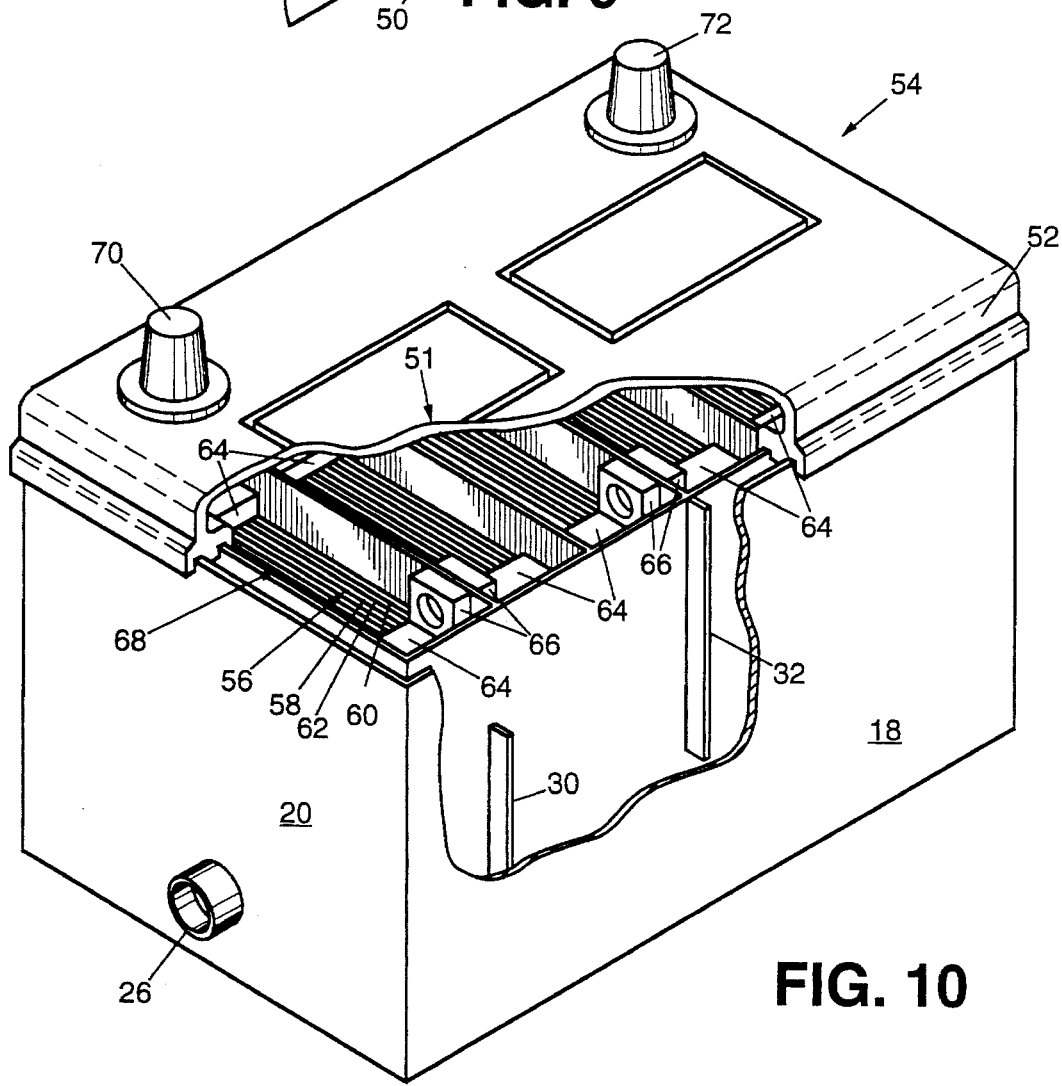
FIG. 10 is a perspective view of one embodiment of a battery in accordance with the present invention, with the cover being partially cutaway to show the cell elements and electrical connections of the battery.

FIG. 10 shows a battery in accordance with the present invention. As can be seen, in the portion of the cover 51 cut away of battery 54, a cell element shown generally at 56 is positioned in each cell. As is conventional, each cell element 56 comprises a series of alternating positive plates 58 and negative plates 60 separated by separators 62. Electrical connections are made through straps 64 and through intercell connectors shown generally at 66. In the end cell shown generally at 68, top terminal 70 is electrically connected to cell element 56. The other terminal 72 is similarly electrically connected in the other end cell.

Any conventional means may be utilized to make the appropriate cell elements and the necessary electrical connections. Indeed, one of the aspects of the present invention resides in the fact that the battery container 10 is amenable to assembly and production techniques already being employed in the commercial production of SLI lead-acid batteries.

Substantial versatility is provided by the present invention. If desired, the container 10 can be dimensioned to fit into conventional BCI SLI group sizes or may be oversized in those applications where conventionally sized cell elements are desired. In either event, any modification required in the size of the cell element can be readily accomplished.

Further, the casting of the strap onto the cell elements, making the intercell connections and sealing the cover to the container may all be carried out as is conventionally practiced with little or no modification required. Of course, sealing of the cover to the container will involve sealing both the outer and inner container walls to the cover; but the conventional sealing process may be used by simply providing appropriate platens to accommodate heat sealing, in effect, two containers rather than one as conventionally required.

FIGS. 11–14 illustrate another embodiment of a container which can be used in the battery of the present invention. The battery container 74 is identical to battery container 10 of the initial embodiment with one exception. More specifically, the principal difference between the two embodiments is that the downwardly depending fluid baffles used in the embodiment of FIGS. 11–14 are separately manufactured and inserted after the container itself is molded, rather than being formed in the molding process as in the container 10.

Figure 11:
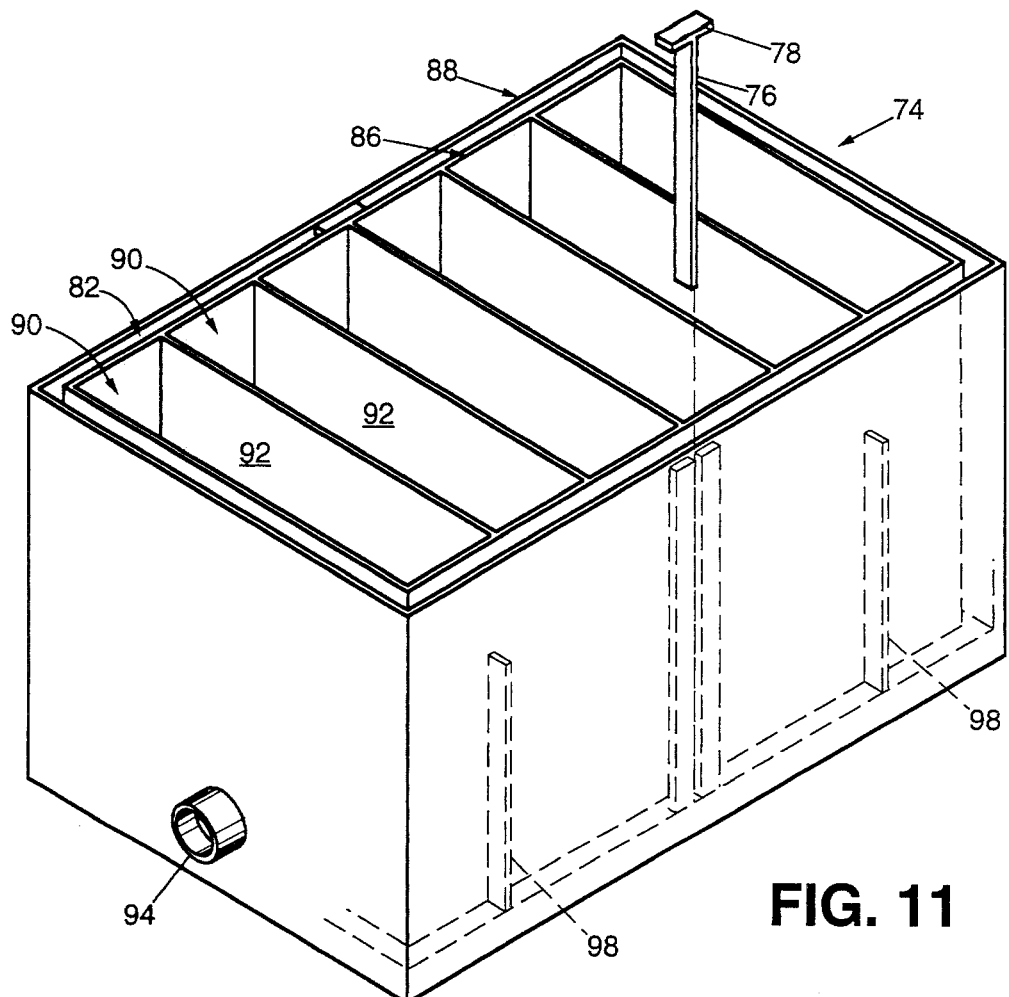
FIG. 11 is a perspective view of a further embodiment of a container that may be used in a battery of the present invention and illustrating an insertable fluid baffle prior to positioning in the container.
Figure 12:
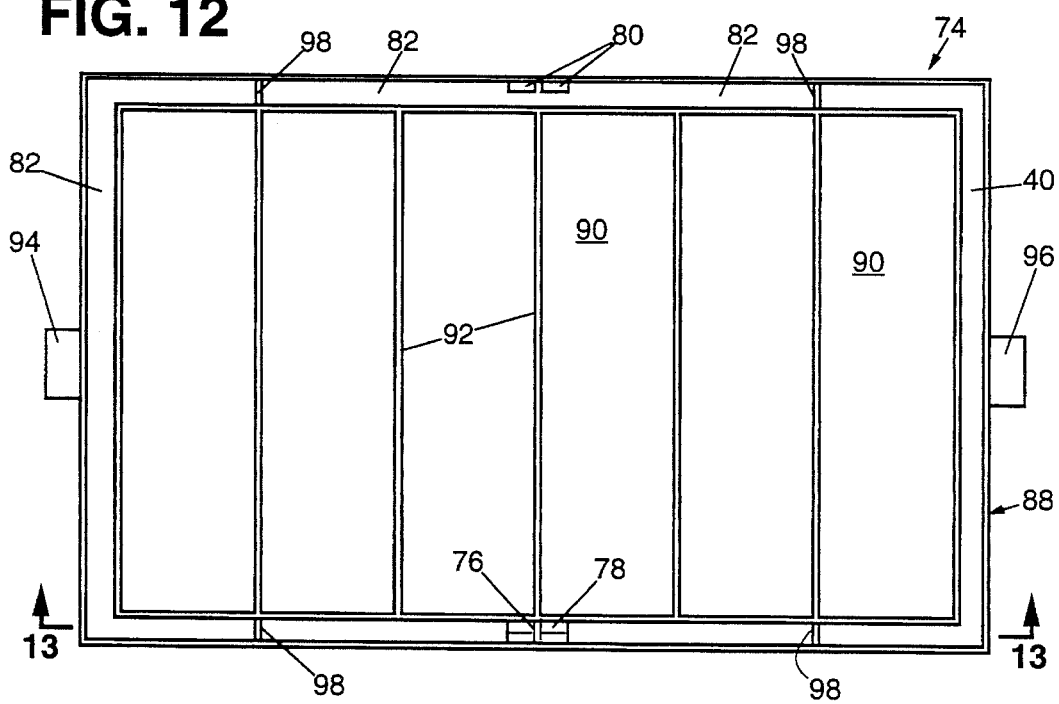
FIG. 12 is a top elevation view of the container embodiment shown in FIG. 11.
Figure 13:
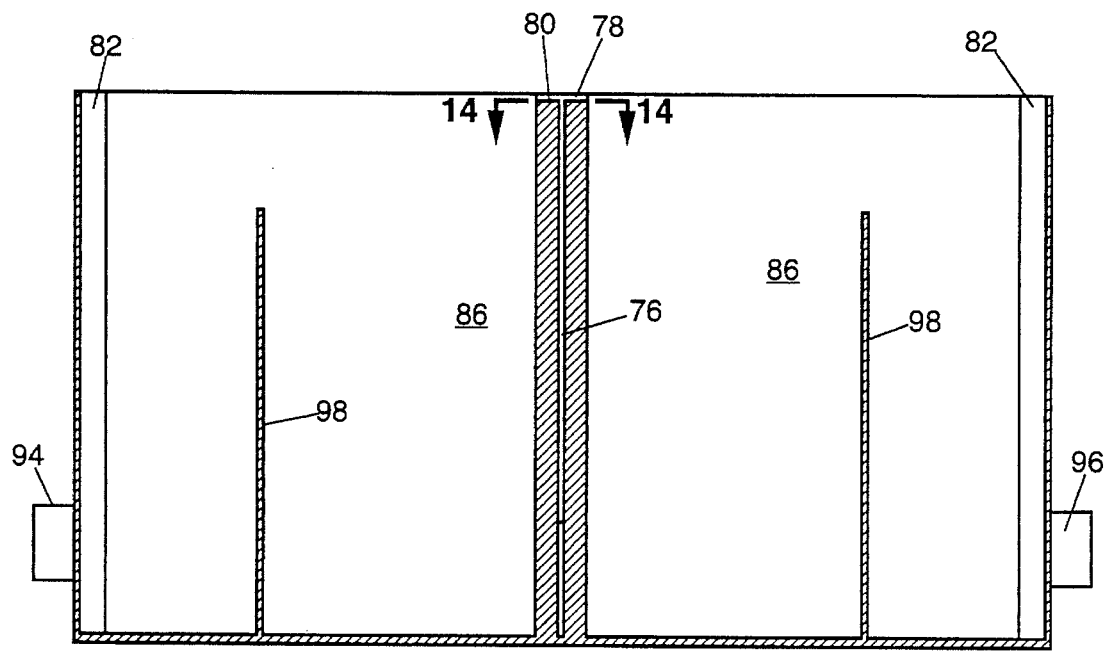
FIG. 13 is a cross-sectional view taken generally along line 13—13 of FIG. 12 and showing the insertable fluid baffle in position in the fluid compartment and guides assisting in the positioning of the fluid baffles.

Thus, as best seen in FIG. 11, one downwardly extending fluid baffle 76 is shown in position for insertion into container 74. Baffle 76 includes a head 78 that may desirably rest into recess 80 formed in fluid compartment 82 and configured to accept head 78. After assembly, head 78 may be tacked in place by conventional heat sealing, as is known.

Figure 14:
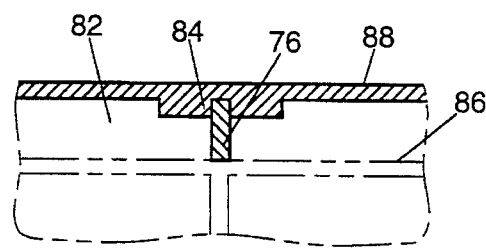
FIG. 14 is a cross-sectional view taken generally along line 14—14 of FIG. 13 and illustrating guides for the fluid baffle.

To facilitate assembly and to assist in maintaining fluid baffles 76 in the desired position, guide means can be utilized if desired. This may be accomplished, as best seen in FIG. 14, by ribs 84 formed into the container and suitably spaced to allow baffle 76 to be forced-fit therebetween.

One result of using this alternative embodiment is that the fluid compartment 82 is free of the apertures 50 (FIG. 5) that result in the other illustrative embodiment. In all other respects, the two illustrative embodiments are identical. Thus, as in the initially described embodiment, the battery container 74 as shown in the embodiment of FIGS. 11–14 includes an inner container 86, an outer container 88, cells 90 formed in inner container 86 by cell partitions 92, a fluid inlet 94 and, if desired, a fluid outlet 96, and upwardly extending fluid baffles 98.

The two illustrative embodiments discussed herein utilize double-walled containers. However, as may be appreciated, the present invention similarly contemplates utilizing a multi-wall container in which two adjacent fluid compartments are used. Indeed, while considered unnecessary and unduly complicated, multi-walled containers having more than two fluid compartments could be used.

It is contemplated that the use of a multi-walled container providing two adjacent fluid compartments might well achieve a degree, and control, of thermal regulation that would be useful for applications that present particularly hostile thermal environments for the battery. One suitable embodiment of a multi-wall container is shown in FIGS. 15–17.

Figure 15:
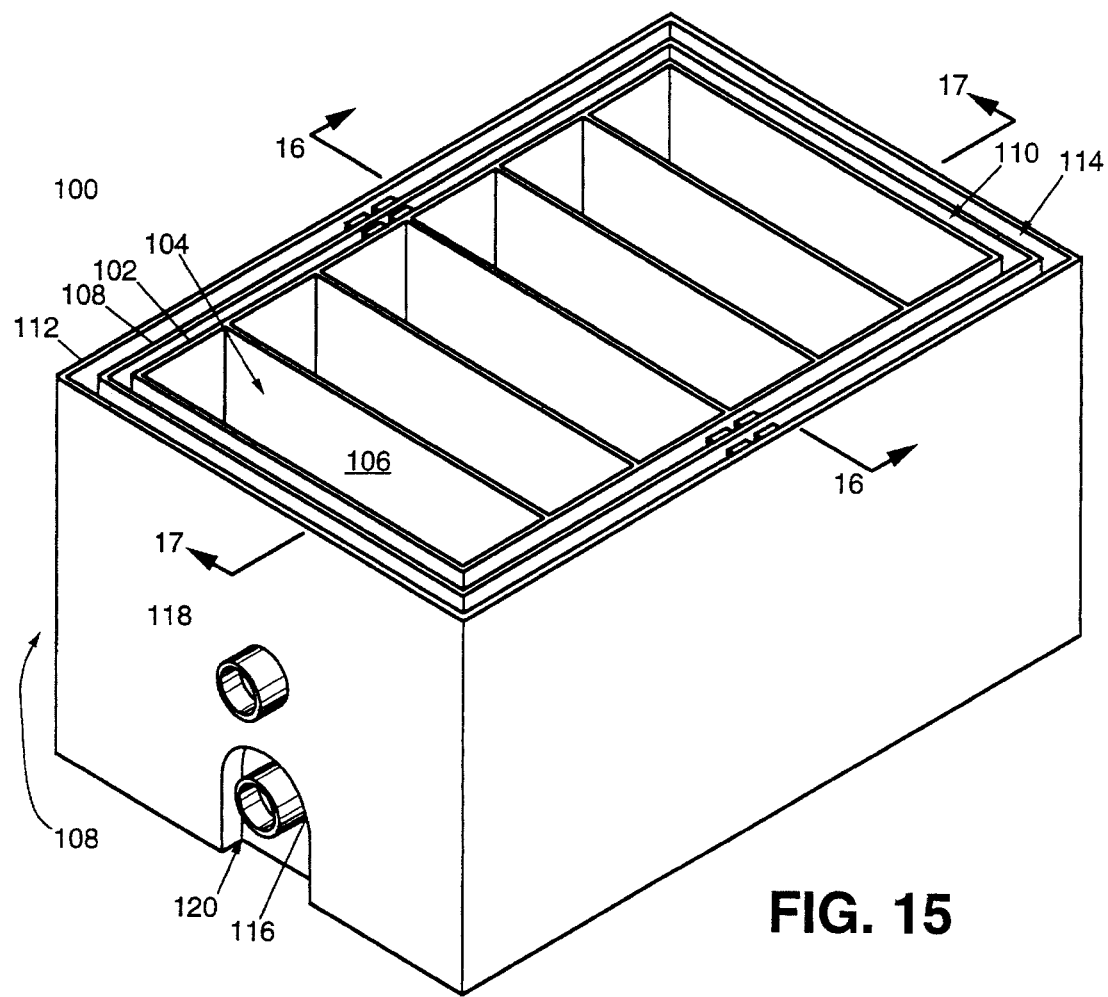
FIG. 15 is a perspective view of a still further embodiment of a container that may be used in a battery of the present invention and showing the two fluid compartments utilized in this container embodiment.
Figure 16:
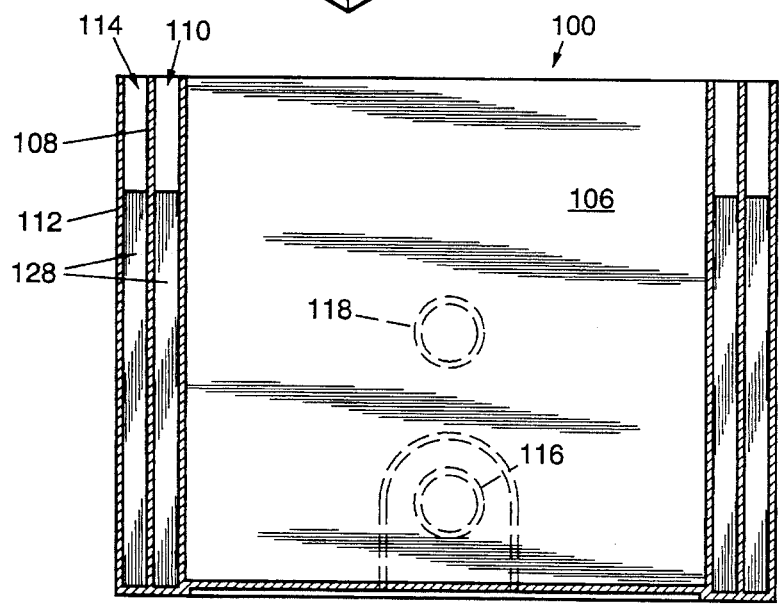
FIG. 16 is a cross-sectional view taken generally along line 16—16 of FIG. 15 and illustrating the relative positioning of the fluid inlets for the two fluid compartments.
Figure 17:
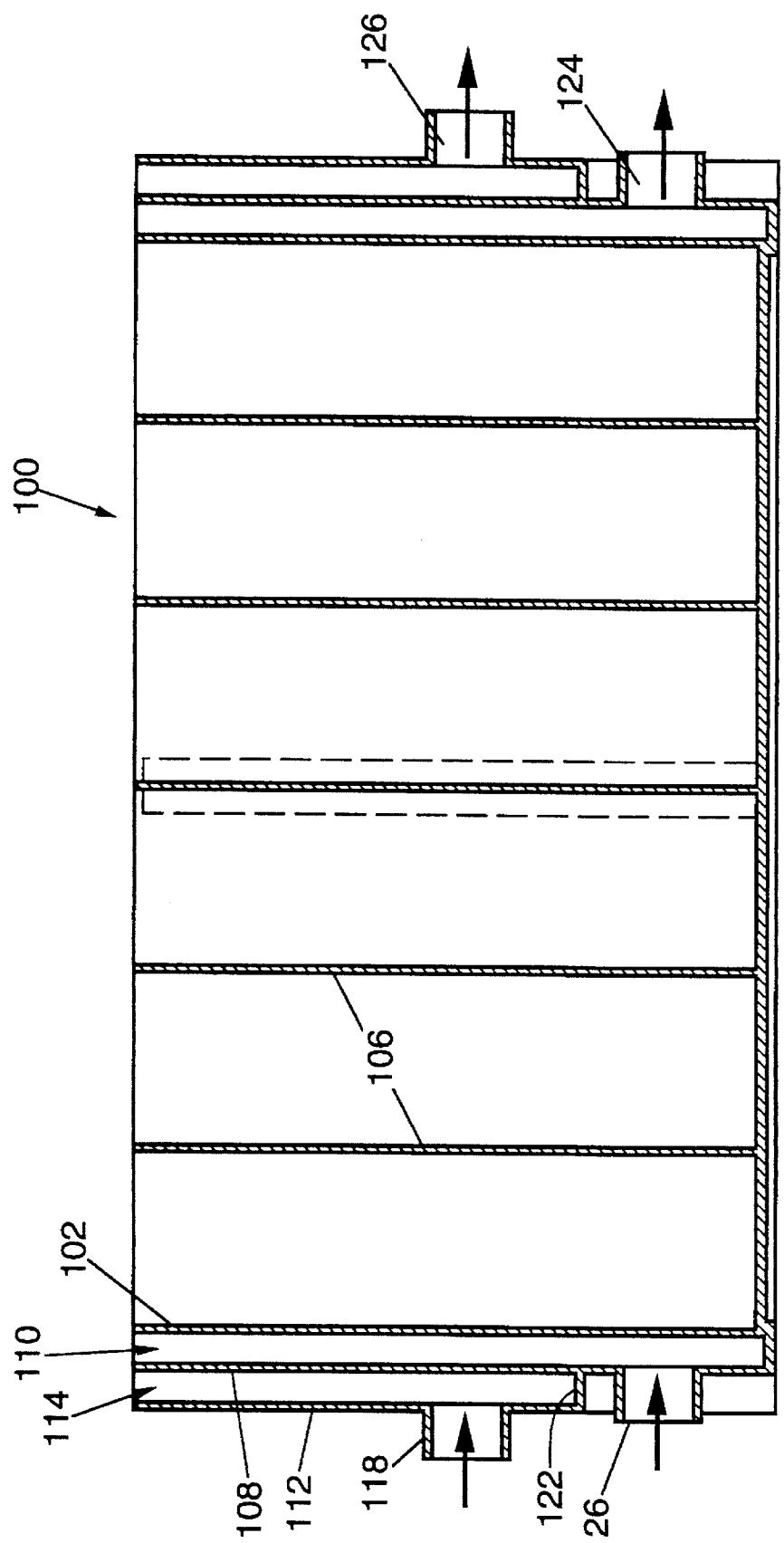
FIG. 17 is a cross-sectional view taken generally along line 17—17 of FIG. 15 and further showing the relative positioning of the two fluid inlets.

As seen in FIGS. 15–17, the multi-wall container 100 includes an inner container 102 divided into cells 104 by cell partitions 106, a first outer container 108 providing a first fluid compartment 110 and a second outer container 112 providing a second fluid compartment 114. First fluid inlet 116 provides ingress into first fluid compartment 110 while second fluid inlet 118 provides ingress into second fluid compartment 114. As best seen in FIGS. 15 and 17, first fluid inlet 116 is inset at 120 (FIG. 15) and the second fluid compartment 114 is separated from the first fluid inlet by partition 122 (FIG. 17). The structure for the two fluid inlets can be molded, as may be appreciated, while providing satisfactorily fluid-tight fluid compartments. Where used, optional first fluid outlet 124 and second outlet 126 (FIG. 17) may be configured and molded in similar fashion to the fluid inlets. Other configurations may be used as desired for the respective fluid inlets and outlets.

In all other respects, multi-walled container 100 may be molded and configured as discussed in relation to the first two embodiments. Thus, any configuration of fluid baffles may be used that will satisfy the criteria for the particular application. As seen in FIG. 16, fluid baffles 128 are shown. Further, the considerations discussed regarding the materials used and the thermal regulation modes for the first two embodiments are applicable to the container embodiment shown in FIGS. 15–17.

One particularly desirable thermal regulation mode for a battery of the present invention utilizing a multi-walled container consists of a dual mode in which a vacuum is maintained in first fluid compartment 110 and air from the heating/cooling system of the vehicle is circulated through second fluid compartment 114. Particularly desirable would be the use of the vacuum pump in the vehicle, supplemented by, if needed, an accumulator so that a vacuum is maintained in first fluid compartment 110 even when the vehicle is not in use. In this fashion, even when not in use, the battery is protected from the surrounding hostile environment.

Thus, as has been seen, the present invention provides a highly versatile solution to the seemingly ever-increasing, more hostile environments in which SLI automotive batteries must reliably perform over the longer service life being demanded by vehicle manufacturers. Yet, the solution achieved is obtained without unduly complicating conventionally used SLI lead-acid battery assembly and manufacturing processes.

While this invention has been disclosed primarily in terms of the specific embodiments thereof, it is not intended to be limited thereto. For example, while described in conjunction with SLI lead-acid batteries, the present invention can be used for other types of batteries used in environments wherein it is desired to reduce the thermal effects by preventing convection-induced, heat transfer from the ambient environment to the battery itself. One example would be lead-acid batteries used for electric vehicle applications. Also, while principally described in connection with alleviating the high underhood temperatures that have proved so significant due to premature failure in service, the present invention is likewise well suited for dealing with cold environments where heating is needed to enhance battery performance. Additionally, while the illustrated embodiments show a top terminal configuration, the present invention may be used with dual terminal configurations as shown, for example, in U.S. Pat. Nos. 4,645,725 and 4,701,386. Likewise, with suitable modification of the fluid compartment, side terminal configuration could also be accommodated. Still further, while injection molding has been discussed herein and is commonly used to make containers for SLI lead-acid batteries, it should be appreciated that any other type of molding could be employed, if desired. Other modifications and embodiments will be apparent to the worker in the art.

What is claimed is:

1. A lead-acid storage battery comprising:

an injection molded, integral plastic container having a bottom and top and comprising an inner container, partitions dividing said inner container into cells, an outer container spaced from said inner container to provide a fluid compartment annular space around the periphery of the battery defined by a height and width and having end and side portions, a series of fluid baffles spanning the width of said fluid compartment, each of said fluid baffles being less than the height of the fluid compartment and providing a fluid flow path through the fluid flow compartment and about the inner container, a fluid inlet formed in said container and allowing ingress into said fluid compartment, a cell element comprising positive and negative plates and separators positioned in said cells, said cells being electrically connected together, a cover sealed to said battery container, and terminals electrically connected to said cell elements.

2. The battery of claim 1, wherein said container is a thermoplastic material.

3. The battery of claim 1, wherein there are three fluid baffles located in each side portion of said fluid compartment.

4. The battery of claim 3, wherein said fluid baffles are aligned with the cell partitions.

5. The battery of claim 1, which includes a fluid outlet in communication with said fluid compartment.

6. The battery of claim 1, which includes fluid baffles downwardly extending from the top of the container.

7. The battery of claim 6, which includes separately formed, downwardly depending fluid baffles.

8. The battery of claim 6, which includes downwardly extending fluid baffles integrally formed with the container.

9. The battery of claim 6, which includes fluid baffles upwardly extending from the bottom of said container and alternately positioned with the downwardly extending fluid baffles.

10. The battery of claim 1, which includes fluid baffles upwardly extending from the bottom of the container.

11. The battery of claim 10, wherein said fluid baffles are integrally formed with said container.

12. The battery of claim 1, wherein said fluid inlet is positioned relative to a fluid baffle adjacent said fluid inlet so as to intercept fluid flow into the fluid compartment through said fluid inlet to cause said fluid flow to traverse the height of said fluid compartment.

13. The battery of claim 1, having a stably dimensioned fluid compartment.

14. The battery of claim 1, wherein said container is an injection-molded plastic.

15. The battery of claim 1, which includes a second outer container spaced from the other outer container which are adjacent to each other to provide a second fluid compartment defined by a height and width and having end and side portions, a second series of fluid baffles spanning the width of said second fluid compartment, each of the fluid baffles of the second series being less than the height of the second fluid compartment and providing a fluid flow path through the second fluid compartment and about the other outer container, a second fluid inlet formed in said container and allowing ingress into said second fluid compartment and said second fluid compartment being partitioned from the other fluid compartment.

* * * * *